Sept. 4, 1945.　　　C. L. OTT　　　2,384,391
CLAMPING FIXTURE
Filed Sept. 11, 1942　　　3 Sheets-Sheet 1
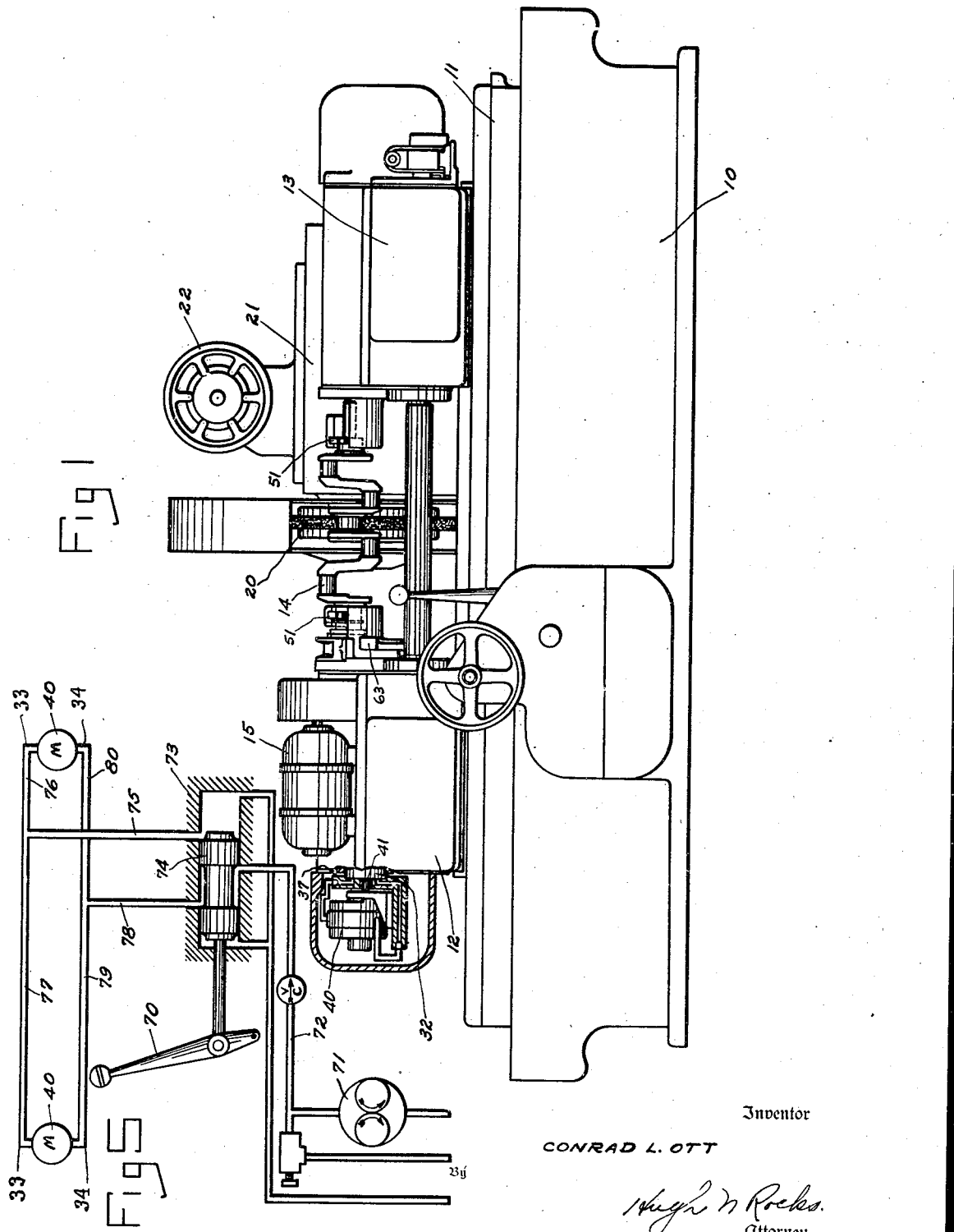
Inventor
CONRAD L. OTT
Attorney Sept. 4, 1945.                     C. L. OTT                      2,384,391
                              CLAMPING FIXTURE
                           Filed Sept. 11, 1942            3 Sheets-Sheet 2
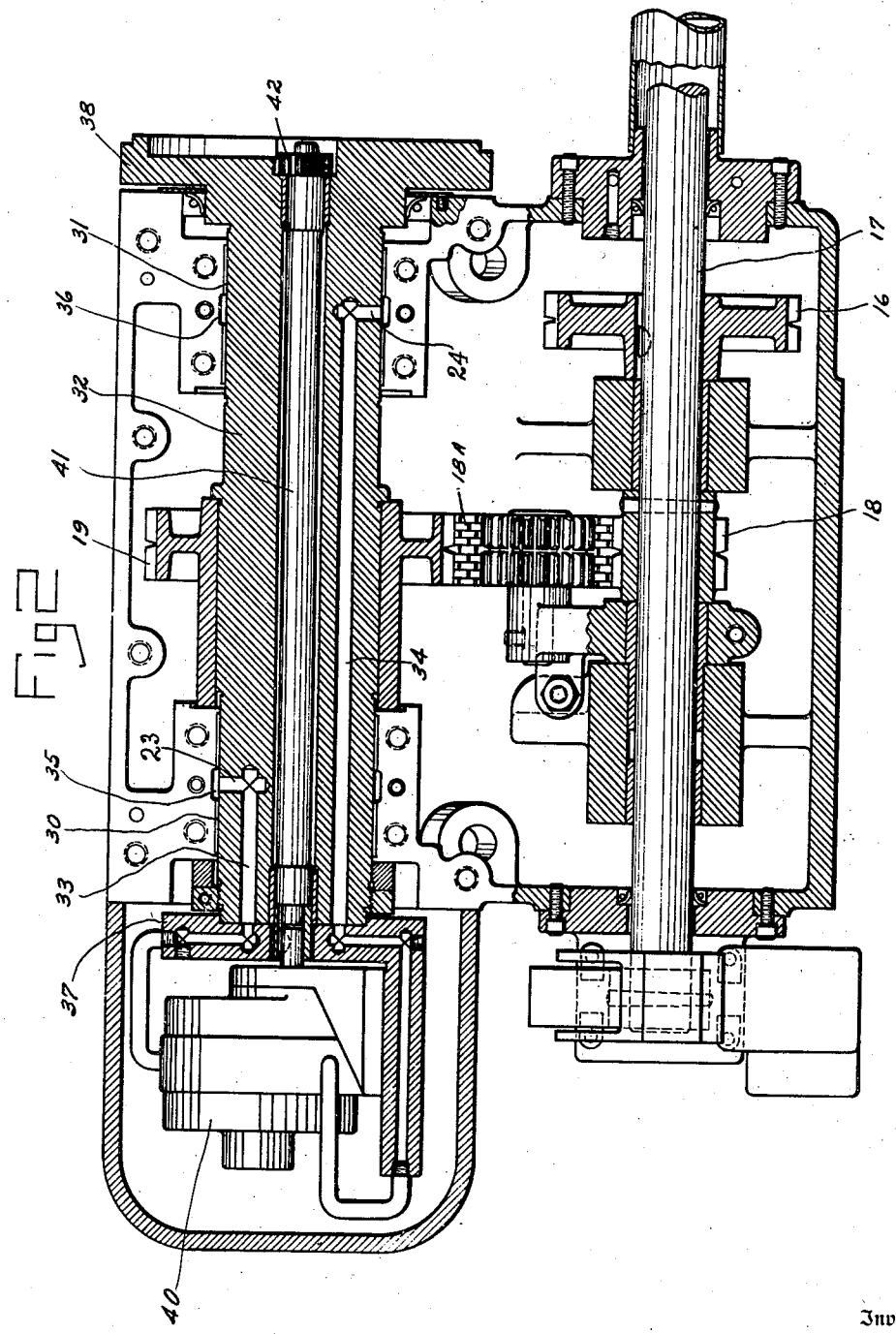
Inventor
CONRAD L. OTT
By
Hugh N Roches
Attorney Sept. 4, 1945.  C. L. OTT  2,384,391
CLAMPING FIXTURE
Filed Sept. 11, 1942   3 Sheets-Sheet 3
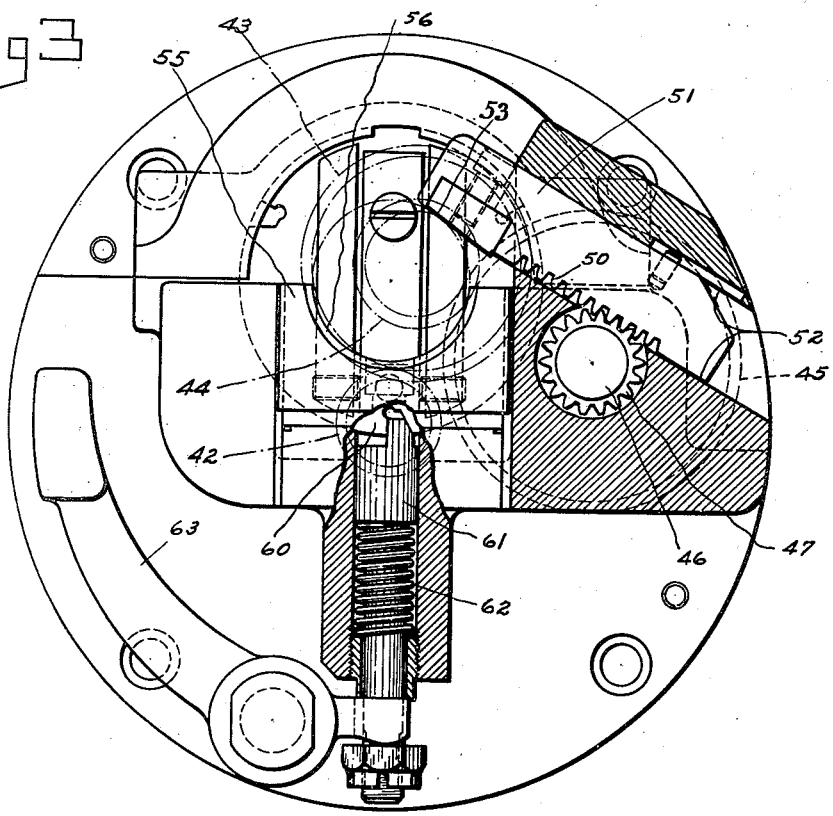
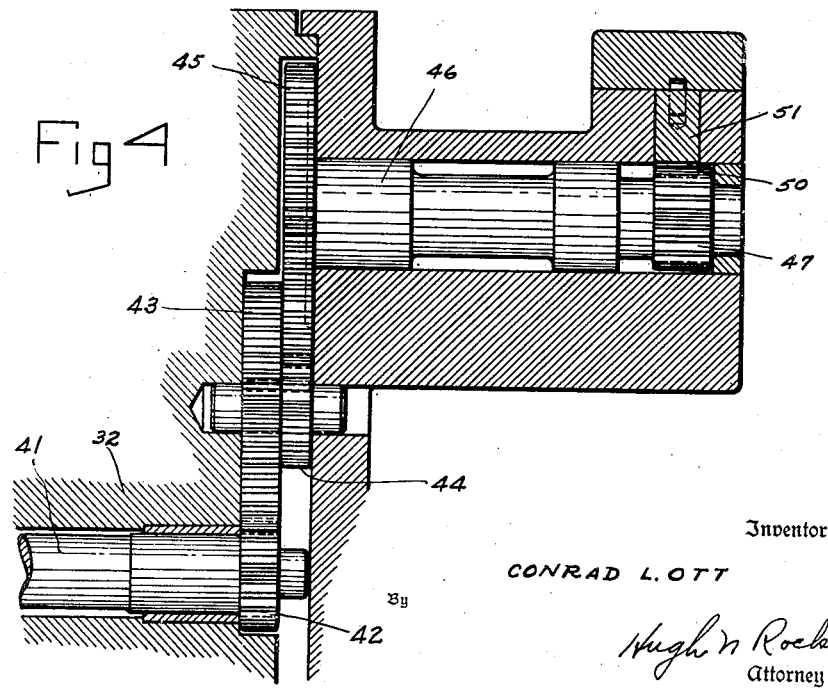
Inventor
CONRAD L. OTT
By Hugh N. Rocks
Attorney Patented Sept. 4, 1945

2,384,391

UNITED STATES PATENT OFFICE 2,384,391

CLAMPING FIXTURE

Conrad L. Ott, Detroit, Mich., assignor to Landis Tool Company, Waynesboro, Pa.

Application September 11, 1942, Serial No. 458,032

2 Claims. (Cl. 51—237)

My invention relates to work clamping devices, particularly of the type used to hold crankshafts during a machining operation.

It is an object of my invention to provide a device for clamping crankshafts which will make use of a sliding clamping element.

A further object is to provide power means for opening and closing said clamping fixture.

A further object is to provide a torque type fluid motor for actuating said clamp.

A further object is to utilize the fluid under pressure for driving said motor, to lubricate the spindle bearings.

A further object is to provide means whereby failure of pressure while a work piece is held by the clamp will not result in release of said work piece.

Figure 1 is a front elevation of a crank grinding machine using my clamping device.

Figure 2 is a sectional plan view of a crank head showing the clamping motor and the fluid passages leading to same.

Figure 3 is an end elevation partly in section of the clamping mechanism.

Figure 4 is a sectional elevation distorted to show the gearing for driving the clamping mechanism.

Figure 5 is a piping diagram.

Numeral 10 indicates the bed of a grinding machine, 11 a work carriage slidably mounted thereon, 12 and 13 the left and right heads respectively, and 14 a work piece held by clamps on said heads. A motor 15 mounted on head 12 drives thru a chain to sprocket 16 on shaft 17. Said shaft provides a common drive means for both heads. Sprocket 18 on said shaft drives thru chain 18A to sprocket 19 on each of the spindles 32.

A grinding wheel 20 is rotatably mounted on a wheel support 21 movable transversely toward and from said work piece. The grinding wheel may be driven by any suitable means such as a motor or jackshaft, neither of which is shown. A handwheel 22 serves to adjust or feed the wheel support toward and from the work.

Each of the heads 12 and 13 consists of a housing in which are mounted spaced bearings 30 and 31 for rotatably supporting a spindle 32. In each of said spindles are two fluid passages 33 and 34; said passages have radial portions 23 and 24 in alignment with circumferential grooves 35 and 36 in bearings 30 and 31 respectively. An end plate 37 secured to the end of spindle 32 is bored to provide continuations of said passages. A portion of said end plate extends in a direction parallel to the axis of said spindle and provides a base to which is secured a reversible hydraulic torque motor 40. From said plate fluid may be conducted by any suitable means such as pipe or tubing to said motor. Fluid under pressure may be introduced into passages 33 and 34 from any suitable source as will be described later. The driving shaft 41 of said motor extends axially thru spindle 32. The end of said spindle opposite said motor is flanged at 38 to provide space for mounting a clamping mechanism. On the flange end of shaft 41 is a pinion 42 which drives a large idler gear 43. Said idler is mounted integrally with a pinion 44 which in turn engages a gear 45. Said gear 45 is mounted on the end of a shaft 46. At the other end of shaft 46 is a pinion 47. Said pinion engages rack teeth 50 on a slidable clamping member 51 having a cam surface 53 for engaging tangentially the surface of 14. Said member is mounted on said flanged portion in guideways 52. A block 55 is mounted eccentrically on an axially extending portion of flange 38 and has a cylindrical recess 56 for receiving the end main bearing of a crank shaft 14.

A notched disk 60 rotatably mounted in flange 38 is a well known means for indexing crankshafts. A latch 61 is urged into engagement with said notches by spring 62. A lever 63 serves to withdraw said latch against the action of said spring.

In operation a work piece 14 is placed in the recessed members 55. The operator shifts lever 70 to the right and fluid under pressure from pump 71 passes thru line 72 to valve housing 73 where valve piston 74 directs it to passage 75. From passage 75 said fluid is distributed thru passages 33, 76 and 77 and the passage in plate 37 to motors 40. Said motors then rotate in a direction to shift the clamping members 51 to clamping position. To release the work, lever 70 and valve 74 is shifted to the left to direct fluid thru passages 34, 78, 79, and 80 and the passage in plate 37 to said motors 40. When fluid is directed to the motors thru these passages, said motors rotate in a direction to withdraw said clamping member and thus release work piece 14. Since it is necessary to apply fluid under pressure to withdraw the clamps, no special safety device is needed. The clamping mechanism is in effect self-locking. In the event of pressure failure while work is in the clamps, said clamps will simply remain in work gripping position. This is a much simpler type of positive lock than is disclosed anywhere in a prior art.

By locating the clamping motor at the outer end of the spindle and spacing it angularly from the clamping mechanism it serves as a counter balance for the clamping mechanism. At the same time this arrangement provides more equal distribution of load to the bearings and simplifies the problem of keeping the work round.

I claim:

1. In a metal working machine, a work supporting and rotating member, including a spindle supported in spaced bearings, a clamping fixture on said spindle, power means for operating said clamping fixture including a fluid pressure operated motor also mounted on said spindle, means for introducing fluid under pressure to said bearing, and passages in said spindle for conducting said fluid to said motor.

2. In a metal working machine, work holding and rotating members, each including a spindle rotatably mounted on spaced bearings therein, a work clamping member on one end of said spindle comprising a block for supporting a work piece, a member slidable tangentially of the work and having a cam surface for clamping said work piece in said block, rack teeth on said member, a pinion for engaging said rack teeth, a shaft extending axially thru said spindle, connections from said shaft to said pinion, and means for rotating said shaft.

CONRAD L. OTT.